US010257091B2

(12) United States Patent
Sampath et al.

(10) Patent No.: US 10,257,091 B2
(45) Date of Patent: Apr. 9, 2019

(54) PIPELINE TABLE IDENTIFICATION

(71) Applicant: HEWLETT PACKARD ENTERPRISE DEVELOPMENT LP, Houston, TX (US)

(72) Inventors: Rangaprasad Sampath, Bangalore (IN); Radhika Hegde Manjeshwar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/302,973

(22) PCT Filed: Jul. 18, 2014

(86) PCT No.: PCT/US2014/047221
§ 371 (c)(1),
(2) Date: Oct. 7, 2016

(87) PCT Pub. No.: WO2015/156832
PCT Pub. Date: Oct. 15, 2015

(65) Prior Publication Data
US 2017/0034058 A1    Feb. 2, 2017

(30) Foreign Application Priority Data

Apr. 8, 2014 (IN) .................. 1858/CHE/2014

(51) Int. Cl.
*H04L 12/64* (2006.01)
*H04L 12/741* (2013.01)
(Continued)

(52) U.S. Cl.
CPC ........ *H04L 45/745* (2013.01); *H04L 12/6418* (2013.01); *H04L 41/00* (2013.01);
(Continued)

(58) Field of Classification Search
CPC ... H04L 45/745; H04L 45/38; H04L 61/2007; H04L 41/20; H04L 61/2557; H04L 29/12; H04L 12/24
See application file for complete search history.

(56) References Cited

U.S. PATENT DOCUMENTS

2013/0010600 A1   1/2013   Jocha et al.
2013/0195113 A1   8/2013   Kotha et al.
(Continued)

FOREIGN PATENT DOCUMENTS

KR   10-2013-0050356 A    5/2013
WO   WO-2013/093857 A1    6/2013
WO   WO-2013/1844225 A1   12/2013

OTHER PUBLICATIONS

Alien, "Hardware Abstraction Layer (HAL)," Jul. 29, 2013, pp. 1-6, Whitepaper.
(Continued)

*Primary Examiner* — Chi Ho A Lee
*Assistant Examiner* — Andrew Lee
(74) *Attorney, Agent, or Firm* — Hewlett Packard Enterprise Patent Department

(57) ABSTRACT

A match field and an action for a flow rule may be received from a software defined networking application. A mapping of table identifications to attributes may be analyzed to obtain a table identification. The table identification may be for a pipeline table of a network device. The pipeline table may be able to implement the match field and the action.

14 Claims, 6 Drawing Sheets

(51) Int. Cl.
- *H04L 12/24* (2006.01)
- *H04L 12/721* (2013.01)
- *H04L 29/12* (2006.01)
- *H04L 29/08* (2006.01)

(52) U.S. Cl.
CPC .............. *H04L 41/20* (2013.01); *H04L 45/38* (2013.01); *H04L 61/2007* (2013.01); *H04L 61/2557* (2013.01); H04L 69/324 (2013.01); H04L 69/325 (2013.01)

(56) References Cited

U.S. PATENT DOCUMENTS

| | | |
|---|---|---|
| 2013/0250770 A1 | 9/2013 | Zou et al. |
| 2014/0052836 A1 | 2/2014 | Nguyen et al. |
| 2014/0092765 A1* | 4/2014 | Agarwal ............... H04W 24/02 370/252 |
| 2014/0146674 A1* | 5/2014 | Wang ..................... H04L 45/38 370/235 |
| 2014/0241356 A1* | 8/2014 | Zhang ..................... H04L 45/38 370/392 |
| 2014/0280834 A1* | 9/2014 | Medved ................ H04L 47/122 709/223 |
| 2015/0043589 A1* | 2/2015 | Han ......................... H04L 45/38 370/392 |
| 2015/0172203 A1* | 6/2015 | DeCusatis ............... H04L 47/70 709/226 |
| 2016/0156504 A1* | 6/2016 | Wang ................... H04L 41/0695 370/217 |
| 2016/0218957 A1* | 7/2016 | Liang ...................... H04L 45/64 |
| 2016/0241459 A1* | 8/2016 | Zheng ..................... H04L 45/38 |
| 2016/0254995 A1* | 9/2016 | Wang ..................... H04L 45/54 370/392 |
| 2017/0237658 A1* | 8/2017 | Roberts ................. H04L 45/745 370/392 |

OTHER PUBLICATIONS

I. Karagyulieva and N. Lago, "OpenFiow and SDN Technical Report" Jan. 2014, pp. 1-74, Technicai Report CESGA-2014-001, CESGA.

International Search Report and Written Opinion, International Application No. PCT/US2014/047221, dated Dec. 17, 2014, pp. 1-7, KIPO.

Saurav Das et al., "SDN Based Unified Control Architecture," May 25, 2012, pp. 1-2, Stanford University, CA, USA.

Pemberton et al., "RYU OpenFlow Controller", 21 pages.

OpenFlow Specification, Version 1.3, Jun. 25, 2012, 105 pages.

GitHub, "SOLID (Single responsibility, Open-closed, Liskov substitution, Interface segregation and Dependency inversion) principles", available online at <https://gist.github.com/alferov/e85863cbaa2143308a25d24bdb101833>, retrieved on Oct. 30, 2018, 1 page.

GitHub, "CPqD/NOX 13 controller", available online at <https://github.com/CPqD/nox13oflib>, retrieved on Oct. 30, 2018, 2 pages.

* cited by examiner

PIPELINE TABLE IDENTIFICATION

BACKGROUND

In networks using software defined networking (SDN), one or more network controllers may manage the control plane of network devices, such as switches, bridges and routers. The network controller may also manage the data plane of the switches by providing flow rules to the switches. The flow rules may have various attributes, such as match fields, meters, go-to instructions, and actions. A flow is a set of packets sharing common attributes. For example, a flow may be defined by layer 2 or link layer information, such as source or destination MAC address; layer 3 or network layer information, such as source or destination IP address; or other information such as frame type, class of service indicator, or frame control information. The match fields of a flow rule establish a corresponding flow by setting the attributes shared by packets of the flow. During operation, if a match field is met by a packet then the network device performs the action on the packet. Match fields may include various criteria, such as source or destination IP or MAC address, port numbers, transport protocol type, frame type, class of service indicators, or frame control information. Actions may include various operations that the switch can perform on packets, such as forwarding the packet to a specified port, dropping the packet, or forwarding the packet to the controller.

BRIEF DESCRIPTION OF THE DRAWINGS

Certain examples are described in the following detailed description and in reference to the drawings, in which.

DETAILED DESCRIPTION OF SPECIFIC EXAMPLES

An SDN network device, such as a switch, may implement a pipeline to evaluate incoming packets according to programmed flow rules. The pipeline may be implemented using a set of tables. Each table may support a set of flow attributes and may store a set of flow rules that can be executed using the set of flow attributes. The set of flow attributes supported by each table may include supported match fields and supported actions. For example, a table of a pipeline may only support an ingress port match field and a forwarding port action. A rule stores in this table would include a specific ingress port criterion with the remaining match fields as wildcards and would specify a specific forwarding port with no other actions. As another example, another table may support all available match fields an all available actions. A rule stored in this table may include any available match criterion and action.

Different tables in a pipeline may be identified by table identifications (IDs). In some cases, different tables may be able to store different numbers of rules. Additionally, some tables of a pipeline may be executed using hardware resources, for example using field-programmable gate arrays (FPGAs) and ternary content addressable memory (TCAM). Other tables of a pipeline may be executed using software resources, such as processors and random access memory (RAM). Different network devices may implement pipelines using different numbers of tables, different table configurations, and different conventions for table IDs.

Some SDN protocols, such as OPENFLOW, require a valid flow rule to include a table ID. Accordingly, an SDN application may need to specifically understand the pipeline exposed by the network device and decipher table capabilities to determine the applicable table ID for a desired flow rule. Such requirements may introduce layers of complexity to the application and obstruct the portability of an application to a network having other devices with different pipeline definitions.

Aspects of the disclosed technology may provide a pipeline abstraction layer allowing SDN applications to make flow decisions without knowledge of the specific table capabilities of a network device's pipeline. The abstractions layer may generate a subscription policy that reflects the capabilities of the network device's pipeline. An SDN application may provide attributes for a flow rule, such as match field and action, to the pipeline abstraction layer in a subscription. The abstraction layer may provide a table ID of a table in the network device's pipeline based on the subscription. This table ID may then be used by the SDN application in a flow rule to the network device.

Figure 1:
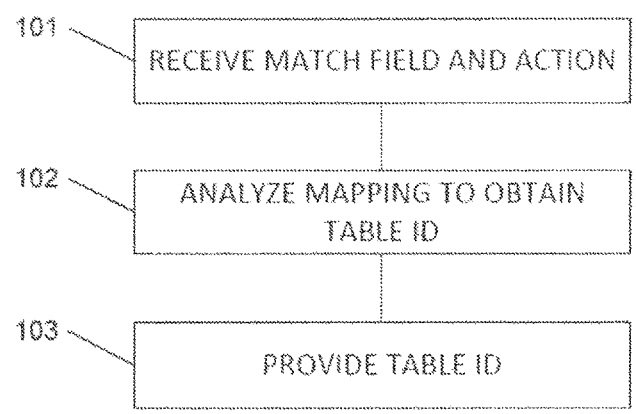
FIG. 1 illustrates an example method of providing a table ID to implement a match field and action for a flow.

FIG. 1 illustrates an example method of providing a table ID to implement a match field and action for a flow. For example, the example method may be executed by a network controller executing a pipeline manager. For example, the network controller may be an OPENFLOW controller and may execute the illustrated method to allow SDN applications to make flow decisions without prior knowledge of a network device's pipeline tables and table ID.

The example method may include block 101. Block 101 may include receiving a match field and an action for a flow rule from a software defined networking (SDN) application. An SDN application may implement its functionality by sending flow rules to network devices of a network. The flow rules include match criteria and associated actions. If a network device receives a packet that meets a flow rule's match criteria, it performs the associated action on the packets. For example, a security application might implement an access control list (ACL) on a network by sending flow rules with address-based match criteria and actions to drop packets or follow legacy switched or routed behavior for packets depending on the packets' addresses. As another example, a monitoring application might implement a session monitoring by providing a rule to a network device to send copies of packets related to a communication session to the network controller. For example, the monitoring application might specify match fields including particular source and destination IP address, and particular source and destination port numbers and specify an action to send a copy of the packet to the controller.

Instead of determining a specific table ID to use in a flow rule for a network device, the SDN application may send a match field and an action for a prospective flow rule to a pipeline manager. The pipeline manager may perform block 101 by receiving the match field and the action. For example, the pipeline manager may be executed by an SDN network controller and the SDN application may be executed by another device connected to the SDN network controller. In this example, block 101 may include receiving the match field and action over an out-of-bound or in-bound connection. As another example, both the pipeline manager and the SDN application may be executed on the network controller. In this example, block 101 may include receiving the match field and action using internal inter-application communications. In further examples, block 101 may be performed by receiving the match field and action from the SDN application via an intermediary. For example, a controller may execute a flow manager that receives the match field and action directly from the SDN application and provides them to the pipeline manager executing block 101.

In some implementations, receiving the match field and the action may include receiving an indication of the type or name of the match field and action to be used in the flow rule. For example, receiving the match field may include receiving an indication that the flow rule will include an IPv4 source address. In other implementations, receiving the match field and the action may also include receiving the value to be used in the flow rule. For example, receiving the match field may include receiving a specific IPv4 source address or bitmask.

The example method may also include block 102. Block 102 may include analyzing a mapping of table identifications (IDs) to attributes to obtain a table ID for a pipeline table of a network device to implement the match field and the action. For example, the mapping may be a representation of the attributes and associated table IDs of the network device, such as a switch, that will receive the flow. Block 102 may be performed to determine which table of the network device's pipeline may store and implement the flow rule.

In some examples, the match field and action received in block 101 may be supported by multiple tables of the network device. Accordingly, multiple associated table IDs may be used in valid flow rules. In some implementations, block 102 may include identifying all or a subset of valid table IDs to support the flow rules.

In other implementations, block 102 may include identifying the table ID using additional considerations. For examples, the mapping may store a number of programmed flows for each table of the pipeline. Block 102 may include identifying a table ID to balance the number of flows in each valid table. For example, a first table with ID X and a second table with ID Y may both support the match fields and actions received in block 101. Analyzing the mapping may include identifying which table has fewer programmed flows and its associated table ID.

In some cases, the SDN application may have an associated priority. Block 102 may include analyzing the mapping to obtain the table ID such that the pipeline table corresponds to the priority value. For example, a table ID for a software-executed table may be identified for a low priority SDN application while a table ID for a hardware-executed table may be identified for a high priority SDN application. In some implementations, priorities may be assigned using values, for examples as priority 1-priority 5. In some cases, the table IDs may be ordered based on priority. For example in a pipeline with 255 tables, table 1 may have the highest priority, while table 255 may have the lowest priority. In some cases, the block 102 may include identifying the lowest available table ID satisfying the match field and action for high priority applications, and identifying the highest available table ID for low priority applications. In other cases, the mapping may include an association of table IDs to allowable SDN priorities. In these cases, block 102 may include identifying an allowable table ID for a table supporting the match field and action.

The example method may also include block 103. Block 103 may include providing the table ID identified in block 102. In some implementations, block 103 may include providing the table ID to the SDN application. In some cases, the table ID may be provided directly to the SDN application. In other cases, the table ID may be provided to the SDN application via an intermediary function, such as a flow manager. In other implementations, block 103 may include providing the flow rule with the table ID to the network device. For example, block 103 may include generating a flow rule having the match field, the action, and the table ID, and providing the flow rule to the network device.

Figure 2A:
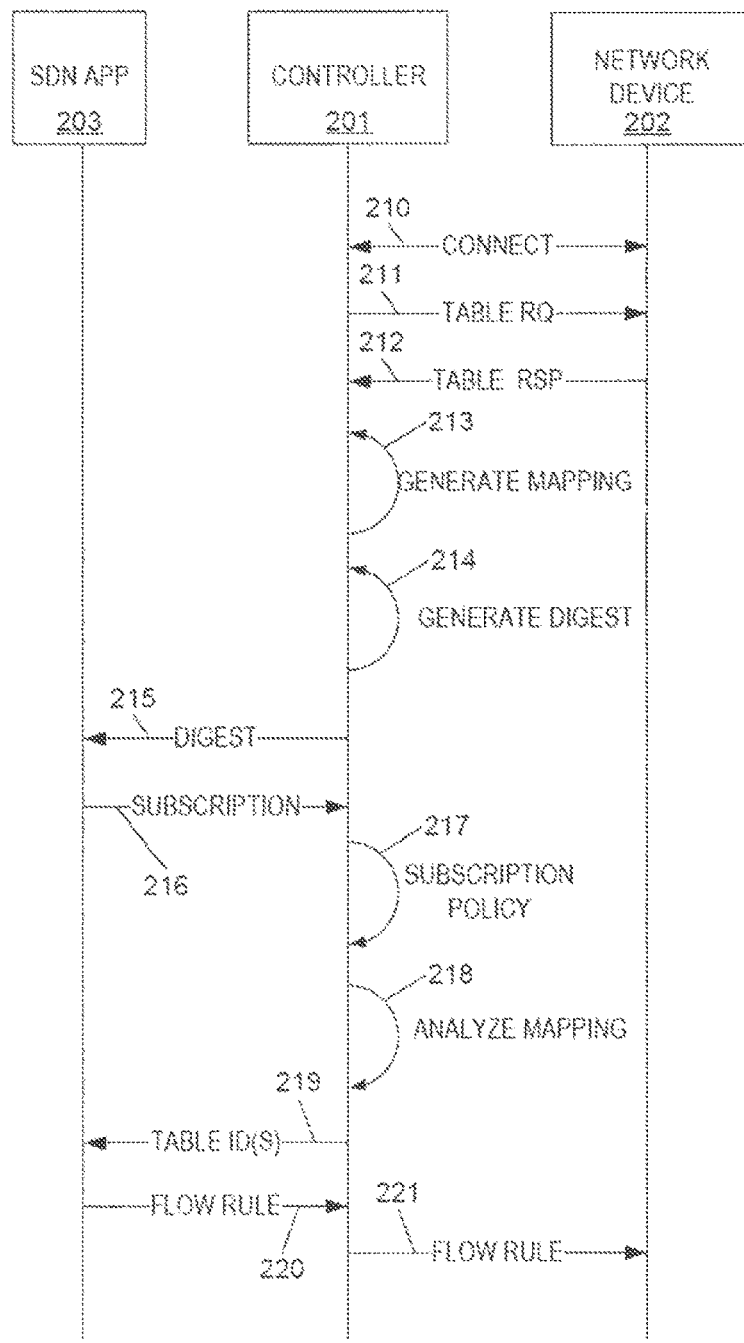
FIG. 2A illustrates an example method of providing a table ID to implement a match field and action for a flow using an attribute digest.

In some implementations, a controller may perform the method of FIG. 1 by generating an attribute digest for the network device and receiving subscriptions to the digest from SDN applications. FIG. 2A illustrates an example method of providing a table ID to implement a match field and action for a flow using an attribute digest. For example, a controller 201 may perform the illustrated method as an implementation of the method of FIG. 1.

The example method may include the controller 201 connecting 210 to a network device 202. For example, the controller 201 and the network device 202 may connect 210 according to an SDN protocol, such as OPENFLOW. For example, the controller 201 and the network device 202 may connect to establish a channel for the controller 201 to send flow rules to the network device 202 and receive packets and information from the network device 202. In some cases, a network device 202 may support multiple connections. For example, an OPENFLOW switch may support multiple OPENFLOW instances on the device, each instance having its own connection. In these cases, step 210 may include the controller connecting to each of the OPENFLOW instances.

The method may further include the controller 201 requesting 211 table information from the network device 202. For example, the controller 201 may send 211 an OPENFLOW Multipart Request for Table Features to the network device 202. The controller 201 may receive 212 a response from the network device 202 detailing a set of attributes provided by the device's pipeline tables and associated table IDs. For example, the controller 201 may receive an OPENFLOW Multipart Reply from the device 202.

If the controller 201 has established multiple connections with the network device 202, the controller may perform steps 211 and 212 for each connection to receive table information for each of the network device's 202 pipelines.

The method may further include the controller 201 using the table information to generate 213 a mapping of table identifications (IDs) to attributes. For example, the mapping may be a pipeline definition that includes a set of table contexts and associated IDs. Each table context may include a set of attributes which correspond to switch capabilities for the table. In some cases, the attributes may be divided into categories, such as match attributes, metering attributes, action attributes, or go-to attributes. These parent attributes may have associated children attributes quantifying the parent attribute in a more definite manner. For example, in an OPENFLOW SDN network, OXM_OF_IN_PORT (physical or switch-defined logical ingress port, as defined in the OPENFLOW specification, version 1.3) may be a child attribute. In additional implementations, the pipeline definition may include logical attributes constructed from switch attributes. For example, a single logical layer 2 match attribute may be defined from a set of switch attributes determining when a layer 2 match occurs. In further implementations, the pipeline definition may include non-standards based attributes, such as flow operational parameters. The flow operational parameters may be attributes impacting how the network device will process flow rules. For example, a flow operational parameter may be a flow scale parameter such as number of flows. As another example, a flow operational parameter may be performance requirement, such as hardware or software table requirements or processing time requirements.

If the controller 201 has established multiple connections with the network device 202, step 213 may include building a mapping for each connection. For example, step 213 may include the controller 201 building a pipeline definition for each connection to the network device 202. The different pipeline definitions may have different attributes. For example, one instance of an SDN protocol executed by the device 202 may support different attributes than another instance. As another example, some instances may be reserved for different purposes than others.

The method may further include the controller 201 generating 214 an attribute digest for the network device 202. The attribute digest may reflect the attributes in the mapping without associated table IDs. For example, the attribute digest may include a normalized set of keys comprising all unique attributes in the mapping. For example, if device 202 supports an OPENFLOW match field OXM_OF_IPV4_SRC (IPv4 source address able to use subnet mask or arbitrary bitmask) in table ID A and table ID B, OXM_OF_IPV4_SRC will be listed in the digest only once. Similarly, if multiple tables support logical attributes established by the controller 201, each logical attribute may be listed only once in the digest. If the device 202 has multiple pipelines corresponding to multiple SDN instances, the attributes digest may include unique attribute names across all pipeline definitions. The digest may further include non-standards based attributes, such as flow operational parameters and logical attributes.

The method may further include the controller 201 providing 215 the digest to an SDN application 203. In response, the controller 201 may receive 216 a subscription to the attribute digest from the SDN application 203. In some cases, step 216 may be an implementation of block 101 of FIG. 1, and the subscription may include a match field and an action for a flow rule. The subscription may be a set of indications associated to every attribute listed in the digest. For example, a 1 may indicate that the application 203 will use the associated attribute in flow rules, and a 0 may indicate that the application 203 will not use the associated attribute. In some cases, the subscription may include values providing information about the flows that the flow rule will establish. For example, the digest may include a number of flows attribute, which may be responded to with a number indicating the application's 203 estimated number of flows that will match the flow rule corresponding to the subscription. As another example, the digest may include a priority attribute, which may be responded to with a value reflecting the priority of the flow rule corresponding to the subscription.

Additionally, in some implementations, the subscription received in step 216 may reflect the requirements of multiple flow rules from the application 203 with the same match field and action. For example, the application 203 may be going to program multiple flow rules having different values for an IPv4 source address match field and different values for a head rewrite action. In these cases, the subscription may include values reflecting the union of the flow rule attributes. For example, the subscription may include the estimated number of flows that will match any of the flow rules that will be programmed by the application 203.

The method may further include the controller 201 saving 217 the subscription received in step 216 as a subscription policy for the SDN application 203. In some implementations, saving 217 the subscription may include compressing the subscription. For example, only attributes having non-zero responses in the subscription may be saved in the subscription policy.

The method may further include the controller 201 analyzing 218 the mapping to obtain a table ID to implement the subscription policy. This may be performed as an implementation of block 103 of FIG. 1. For example, the controller 201 may create a tree whose nodes are the unique attributes of the pipeline definition of a connection. There may be more than one table for every path in the tree because of common attributes between tables. In some cases, multiple table Ids are returned. In other cases, the controller 201 may employ a conflict resolution method, such as selecting table ID based on a priority of the SDN application.

If the controller 201 has received 216 a flow operational parameter for the flow rule from the SDN application 203 as an attribute key the subscription step 218 may include analyzing the mapping to obtain a table ID for a pipeline table that supports the flow operational parameter. For example, if the flow operational parameter indicates a requirement for hardware execution, then the obtained table ID may correspond to a hardware table. As another example, if the flow operational parameter indicates a certain flow scale, the obtained table ID may correspond to a table supporting the flow scale. In some cases, the controller 201 may assign software tables by default, unless the flow operational parameters indicate a requirement for a hardware table.

In step 218, the controller 201 may determine that a single table of the pipeline does not support all attributes in the subscription. In some implementations, if this occurs, the controller 201 may alert the application 203 and request it to resend a subscription. In other implementations, the controller 201 may determine that the subscription can be satisfied by combining the operations of multiple flow tables. For example, the device 202 may support go-to attributes. This may allow a desired flow behavior to be programmed using multiple flow rules on different tables. For example, the device 202 may have a first hardware table, ID C, supporting only source IP address match fields and a second hardware table, ID D, supporting only destination IP address match fields. Accordingly, to implement desired flow behavior for hardware execution on a flow defined by source and destination IP address, both tables, IDs C and D, must be used. The controller 201 may perform step 218 to obtain the multiple table IDs to support a subscription. In still further implementations, the controller 201 may generate a logical or dummy table ID that does not correspond directly to a table ID of a table of the device 202. Instead, the dummy table ID may be a table ID for a combination of pipeline tables required to support the subscription. The controller 201 may store the dummy ID associated with the combination. When receiving a flow rule containing the dummy ID, the controller 201 may translate the flow rule into multiple flow rules with appropriate go-to commands to implement the received flow rule on the device 202.

The method may further include the controller 201 providing 219 the table ID to the SDN application 203. Step 219 may be performed as an implementation of block 103 of FIG. 1. In some cases, multiple IDs for tables that each individually satisfy the subscription may be provided 219. In other cases, multiple IDs for tables that satisfy the subscription in combination may be provided 219. In these cases, an indication of which attributes are supported by which tables may also be provided to allow the application 203 to generate the correct flow rules for the desired flow behavior.

The method may further include the controller 201 receiving 220 a flow rule from the SDN application 203. The flow rule may contain a table ID provided in step 219 may have all or a subset of the flow rule attributes, such as match fields and actions, reflected in the subscription received in step 216.

The method may further include the controller 201 programming 221 the network device 202 with the flow rule. Alternatively, the method may include the controller 201 programming the network device with a set of flow rules to implement the flow behavior reflected in the flow rule received in step 220. For example, this may occur if the flow rule received in step 220 had a dummy table ID corresponding to a combination of tables of the network device 202.

Steps 220 and 221 may be repeated for a number of flow rules covered by the subscription received in step 216. If the SDN application desires to program the device 202 with flow rules having different attributes, it may send a second subscription to the digest, and the method may repeat from step 216.

Figure 2B:
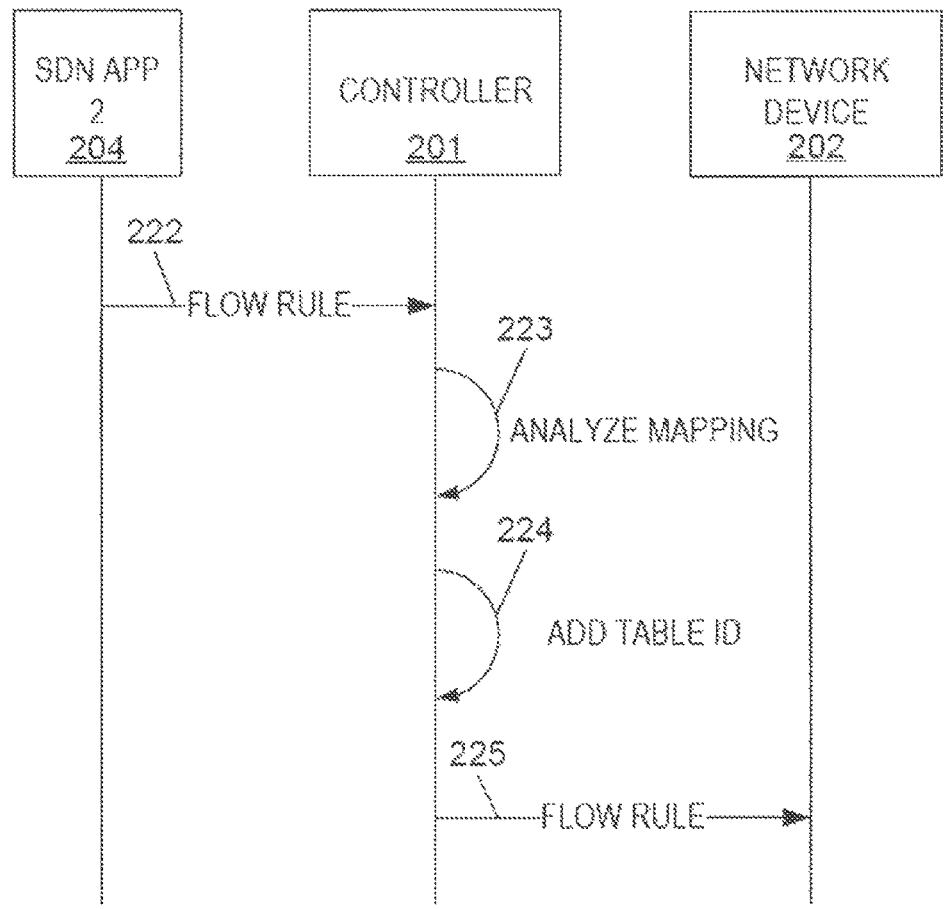
FIG. 2B illustrates an example method of analyzing an incoming flow rule to provide a valid table ID in an outgoing flow rule.

In some implementations, a controller may perform the method of FIG. 1 by receiving a flow rule from an SDN application that lacks a valid table ID and providing a valid table ID for the flow rule. FIG. 2B illustrates an example method of analyzing an incoming flow rule to provide a valid table ID in an outgoing flow rule. The controller 201 of FIG. 2A may perform the illustrated method steps after step 213. For example, the steps 222-225 may be performed before, after, or concurrently with steps 214-221.

The illustrated method may include performing block 101 of FIG. 1 by receiving 222 the match field and the action in a first flow rule. For example, the flow rule may be received 222 from a second SDN application 204 that does not provide a subscription policy. In another example, the flow rule 222 may be received from the first SDN application 203 as a flow rule outside the coverage of the subscription. The first flow rule may lack a valid table ID for a pipeline table of the network device 202. For example, the table ID field of the flow rule may be blank, may have a wildcard value, may have a value exceeding an allowable range, or may have a value that corresponds to a table that does not support the flow rule's other attributes.

The method may include performing block 102 of FIG. 1 by analyzing 223 the mapping to obtain a table ID for a pipeline table to implement the match field and action in the first flow rule received in step 222. If multiple table IDs satisfy the match field and the action, the controller 201 may select one using a conflict resolution technique, or according to a priority of the application 204. In other implementations, step 223 may include determining a combination of table IDs to satisfy the behavior reflected in the first flow rule. For example, this may occur if a single table will not satisfy match fields and actions in the first flow rule.

The method may further include adding 224 the table ID to a second flow rule. For example, step 224 may include adding the table ID to the second flow rule. The second flow rule may a version of the first flow rule having the same attributes but include a valid table ID determined in step 223.

The method may further include providing 225 the second flow rule to the network device 202. In further implementations, step 225 may include provide a plurality of flow rules to the network device 202 to implement the behavior reflected in the first flow rule 204.

Figure 3:
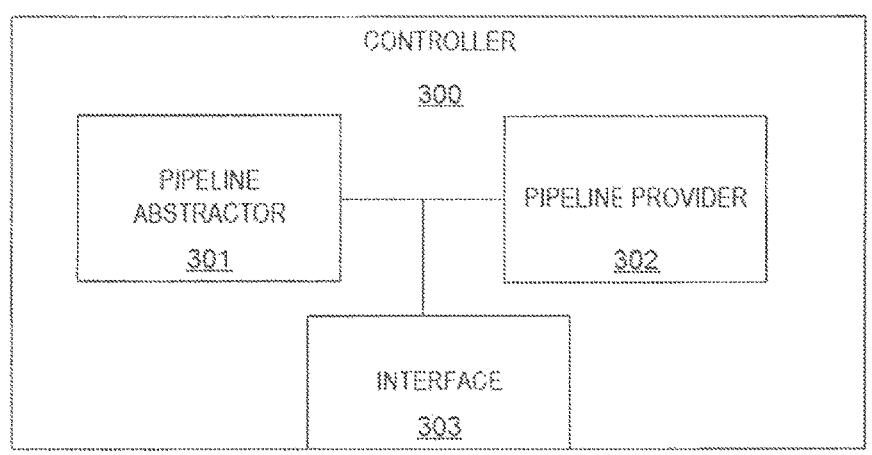
FIG. 3 illustrates an example network controller including a pipeline abstractor and a pipeline provider.

FIG. 3 illustrates an example network controller 300 including a pipeline abstractor 301 and a pipeline provider 302. For example, the pipeline abstractor 301 and pipeline provider 302 may be implemented as instructions stores on a non-transitory computer readable medium and executed by a processor of the controller 300.

The pipeline abstractor 301 may obtain a plurality of table IDs and corresponding table attributes from a network device. For example, the network device may be connected to the controller 300 using a network interface 303 as described with respect to step 210 of FIG. 2A. The pipeline abstractor 301 may obtain the plurality of table IDs and attributes from the network device through a response to an information request, such as described with respect to steps 211 and 21 of FIG. 2A.

The pipeline abstractor 301 may use the table attributes to generate a digest of network device capabilities. The digest may provide an abstraction of the network device's pipeline. The digest of network capabilities may include flow operation parameters, such as flow scale attributes and performance attributes. For example, the digest may be generated as described with respect to steps 213 and 214 of FIG. 2A.

The pipeline provider 302 may provide the digest to an SDN application. For example, the pipeline provider 302 may use the interface 303 to the SDN application. As another example, the SDN application may be executed by the controller 300 and the pipeline abstractor 301 may provide the digest using inter-process communications.

The pipeline provider 302 may obtain a subscription to the digest from the SDN application. The subscription may indicate which attributes the SDN application will use in future flows. These attributes may include both table attributes specifically supported by the pipeline of the network device and logical attributes generated from the specific attributes. The subscription may also indicate flow requirements. For example, the flow requirements may be flow operational parameters, such as required flow scale or performance requirements. For example, the pipeline provider 302 may be configured to perform steps 215-216 of FIG. 2A.

The pipeline provider 302 may provide a table ID of the plurality of table IDs satisfying the subscription. For example, the pipeline provider 302 may use the subscription and the information obtained by the pipeline abstractor 301 to obtain the table ID satisfying the subscription. If the subscription includes flow requirements, the pipeline provider 302 may use the flow requirement to determine whether to satisfy the subscription using a hardware table or a software table. For example, the pipeline provider 302 may provide the table ID as described with respect to steps 217-221 of FIG. 2A.

In some implementations, the pipeline provider 302 may be configured to receive a flow rule lacking a valid table ID and to provide a flow rule having the same attributes and including a valid table ID. For example, the pipeline provider 302 may be configured to perform the method steps 222-224 described with respect to FIG. 2B.

Figure 4:
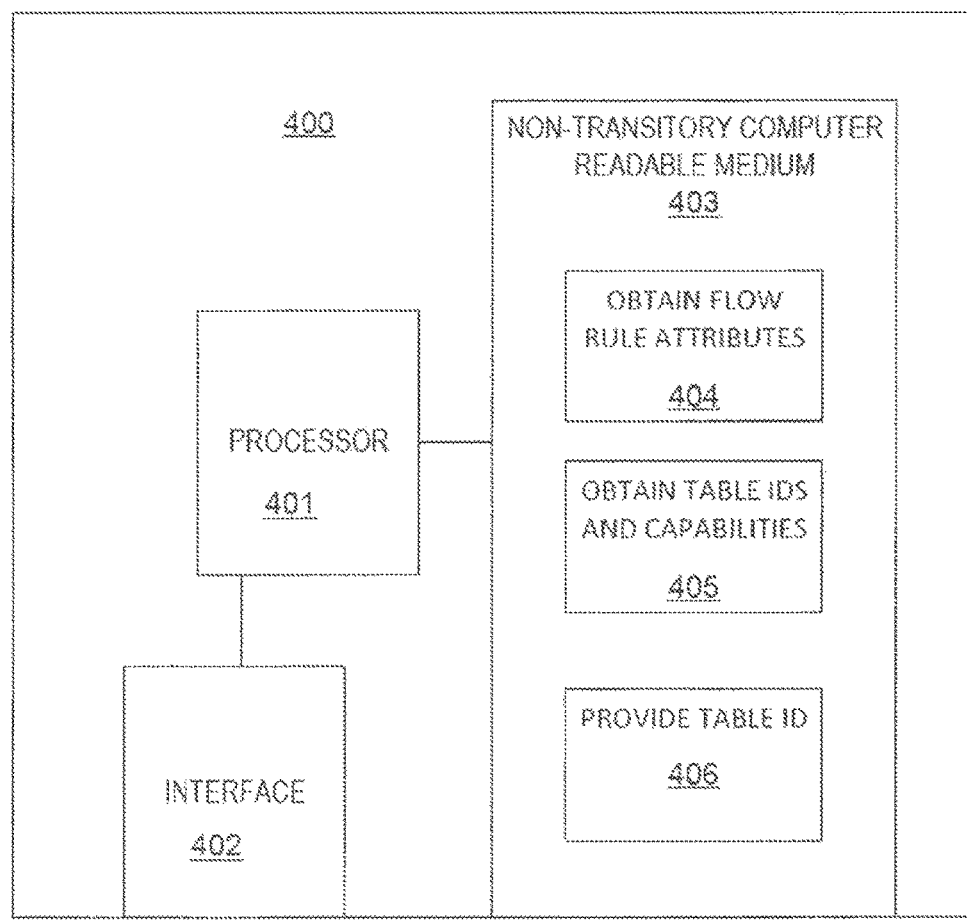
FIG. 4 illustrates an example network controller including a non-transitory computer readable medium storing instructions executable by a processor to provide a table ID for a pipeline table.

FIG. 4 illustrates an example network controller 400 including a non-transitory computer readable medium 403 storing instructions executable by a processor 401 to provide a table ID for a pipeline table. In various implementations, the medium 403 may include RAM, flash memory, read-only memory (ROM), storage volumes, or a combination thereof. The illustrated controller 400 may be an implementation of an example controller 300 of FIG. 3.

The medium 403 may store instructions 404 executable by the processor 401 to obtain a set of flow rule attributes. In some cases, the set of flow rule attributes may be attributes that will be used by an SDN application in future flow rules. In other cases, the flow rule attributes may be contained in a version of a flow rule that lacks a valid table ID. In some cases, the flow rule attributes may be obtained from an SDN application executed by the processor 401. In other cases, the flow rule attributes may be obtained from an SDN application executed on another device connected to the controller 400. For example, the flow rule attributes may be obtained via a network interface 402. In some implementations, the processor 401 may perform block 101 of FIG. 1 be executing the instructions 404.

The medium 403 may store instructions 405 executable by the processor 401 to obtain a plurality of table IDs and a corresponding set of table capabilities of a pipeline of a network device. For example, the instructions 405 may be executable by the processor 401 to obtain the plurality of table IDs and corresponding set of table capabilities from a connected network device via the interface 402. For example, the processor 401 may execute the instructions 405 to perform steps 211-212 of FIG. 2A.

The medium 403 may store instructions 406 executable by the processor 401 to provide a table ID for a table of the pipeline supporting the set of flow rule attributes. For example, the instructions 406 may be executable by the processor 401 to generate a mapping of table IDs to attributes. For example, the instructions 406 may be executable by the processor 401 to generate the mapping as described with respect to step 213 of FIG. 2A. The instructions 406 may be further executable to use the mapping to obtain a table ID for a table of the pipeline that supports the set of flow rule attributes. For example, the instructions 406 may be executable by the processor to perform block 102 of FIG. 1, step 218 of FIG. 2A, or step 223 of FIG. 2B. The instructions 405 may be further executable by the processor 401 to provide the table ID supporting the set of attributes. For example, the processor 401 may provide the table ID to an SDN application executed in the controller 400, to an SDN application executed on another device, or to a network device, such as a switch, as a flow rule. For example, the instructions 401 may be executable to perform block 103 of FIG. 1, step 219 of FIG. 2A, or step 225 of FIG. 2B.

Figure 5:
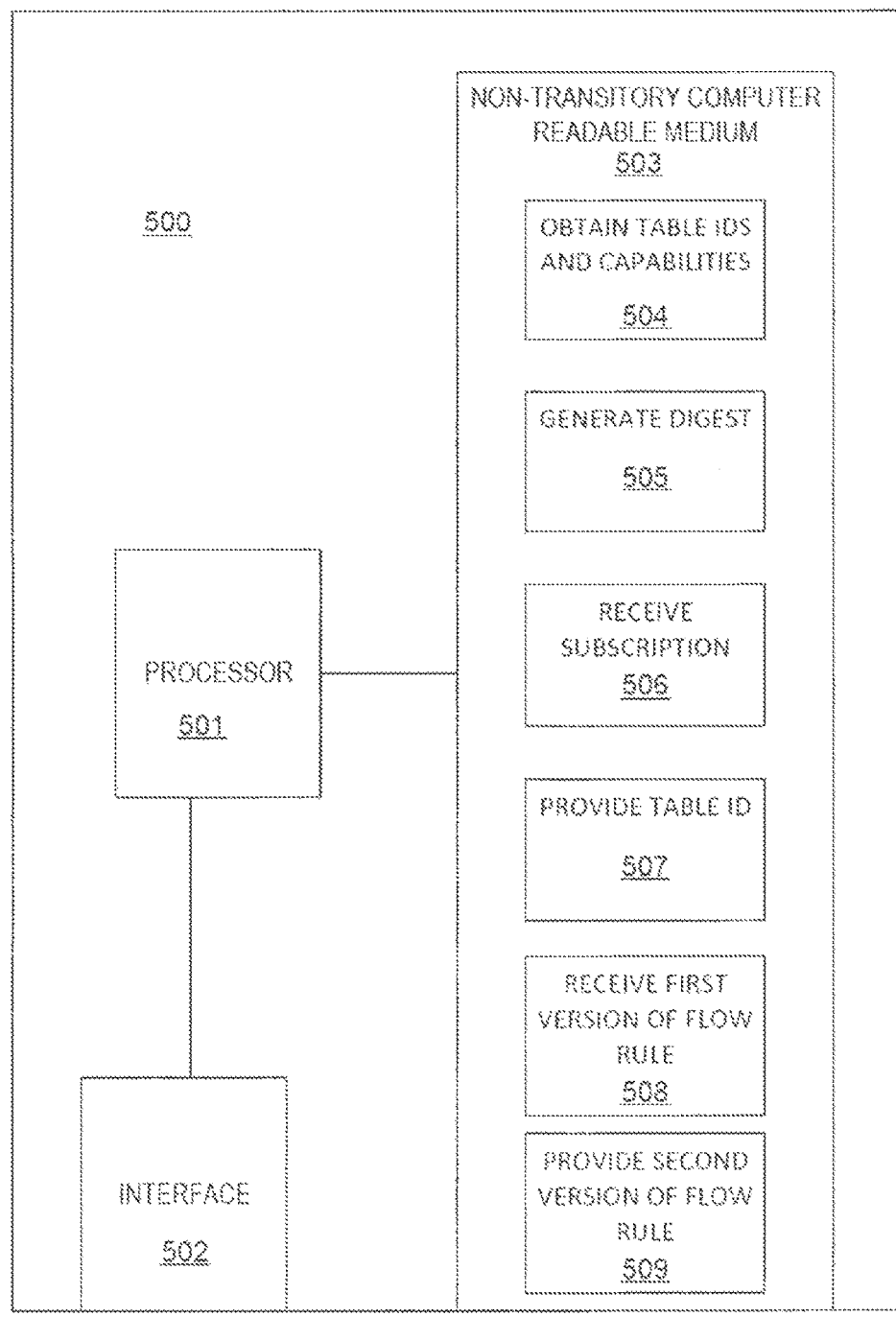
FIG. 5 illustrates an example network controller including a non-transitory computer readable medium storing instructions executable by a processor to generate a flow attribute digest and to validate received flow rules.

FIG. 5 illustrates an example network controller 500 including a non-transitory computer readable medium 503 storing instructions executable by a processor 501 to generate a flow attribute digest and to validate received flow rules. For example, the illustrated controller 500 may be an implementation of example controller 300 of FIG. 3 or controller 400 of FIG. 4.

The medium 503 may store instructions 504 executable by the processor 501 to obtain a plurality of table IDs and a corresponding set of table capabilities of a pipeline of a network device. The instructions 504 may be executable to receive the plurality of table IDs and set of table capabilities from the network device over a network interface 502. For example, the instructions 504 may be executable as described with respect to instructions 405 of FIG. 4. As an example, the network device may be an OPENFLOW switch and the IDs and set of table capabilities may be received on a network management channel as part of a multi-part response implemented in accordance with an OPENFLOW protocol.

The medium 503 may store instructions 505 executable by the processor 501 to generate a digest from the set of table capabilities. The digest may include attributes corresponding to valid fields in a flow rule, such as match fields, actions, monitors, and go-to commands. The digest may also include logical attributes generated from one or more of the table capabilities, and other attributes, such as flow operational parameters. For example, the instructions 505 may be executable by the processor 501 to generate a digest as described with respect to step 214 of FIG. 2A. The instructions 505 may be further executable by the processor 501 to provide the digest to an SDN application. For example, the instructions 505 may be executable to perform step 215 of FIG. 2A.

The medium 503 may store instructions 506 executable by the processor 501 to receive a set of flow rule attributes as a subscription to the digest. Instructions 506 may be an implementation of the instructions 404 of FIG. 4 and may be executable by the processor 501 to perform step 216 of FIG. 2A. For example, the subscription may be a set of keys to the digest indicating which of the attributes listed in the digest the SDN application will use in future flows.

The medium 503 may store instructions 507 executable by the processor 501 to provide the table ID. For example, the instructions 507 may be an implementation of instructions 406 of FIG. 4. In some cases, the instructions 507 may be executable by the processor 501 to provide the table ID by selecting a hardware table ID or a software table ID based on the subscription. For example, the subscription may include attributes, such as a flow scale parameter, that may be satisfied by hardware or software execution. As another example, the subscription may include a request for hardware or software performance as an attribute. For example, the instructions 507 may be executable by the processor 501 to perform steps 217-219 of FIG. 2A.

The medium 503 may store flow rule validation instructions 508-509. This may include instructions 508 executable by the processor 501 to receive the set of flow rule attributes as a first version of a flow rule, the first version of the flow rule lacking a valid table ID. For example, the instructions 508 may be executable by the processor 501 to perform step 222 of FIG. 2B, where the first version of the flow rule is the flow rule obtained in step 222.

The flow validation instructions may also include instructions 509 executable by the processor 501 to provide a second version of the flow rule, the second version of the flow rule including the table ID. For example, the processor 501 may execute the instructions 509 and provide the second version of the flow rule to a connected network device. Upon receiving the second version of the flow rule, the connected network device may program its flow table corresponding to the table ID with the attributes included in the flow rule. For example, the processor 501 may execute the instructions 509 to perform step 225 of FIG. 2B.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

We claim:

1. A method comprising:
   receiving a match field and an action for a flow rule from a software defined networking (SDN) application generating an attribute digest for the network device;
   providing the attribute digest to the SDN application; and
   receiving the match field and the action in a subscription to the attribute digest providing a table ID to the SDN application satisfying the subscription; and
   using the action to determine whether to satisfy the subscription using a hardware table or a software table.

2. The method of claim 1, further comprising:
   providing multiple table IDs satisfying the subscription to the SDN application.

3. The method of claim 1, wherein the flow operational parameter is a flow scale or performance requirement.

4. The method of claim 1, further comprising:
   analyzing a mapping of table identifications (IDs) to attributes to obtain the table ID for a pipeline table of a network device to implement the match field and the action.

5. The method of claim 4, further comprising:
   analyzing the mapping to obtain the table ID such that the pipeline table corresponds to a priority value associated with the SDN application.

6. The method of claim 4, further comprising:
   receiving a flow operational parameter for the flow rule from the SDN application; and
   analyzing the mapping to obtain the table ID such that the pipeline table supports the flow operational parameter.

7. The method of claim 6, wherein the flow operational parameter is a flow scale or performance requirement.

8. The method of claim 4, further comprising:
   receiving the match field and the action in a first flow rule, the first flow rule lacking the table ID; and
   providing the table ID to a flow manager in a second flow rule.

9. A controller, comprising:
   a pipeline abstractor to:
      obtain a plurality of table identifications (IDs) and corresponding table attributes from a network device; and
      use the table attributes to generate a digest of network device capabilities;
   a pipeline provider to:
      obtain a subscription to the digest from a software defined networking (SDN) application, wherein the subscription includes a match field and a flow requirement;
      provide a table ID of the plurality of table IDs satisfying the subscription; and
      use the flow requirement to determine whether to satisfy the subscription using a hardware table or a software table.

10. The controller of claim 9, wherein the pipeline provider is to provide multiple table IDs satisfying the subscription to the SDN application.

11. A non-transitory computer readable medium storing instructions executable by a processor to:
    obtain a set of flow rule attributes as a subscription to a digest;
    obtain a plurality of table identifications (IDs) and a corresponding set of table capabilities of a pipeline of a network device;
    provide a table ID for a table of the pipeline supporting the set of flow rule attributes, by selecting a hardware table ID or a software table ID based on the subscription.

12. The non-transitory computer readable medium of claim 11, storing instructions executable by the processor to:
    receive the set of flow rule attributes as a first version of a flow rule, the first version of the flow rule lacking a valid table ID; and
    provide a second version of the flow rule, the second version of the flow rule including the table ID.

13. The non-transitory computer readable medium of claim 11, storing instructions executable by the processor to:
    provide multiple table IDs satisfying the subscription to the SDN application.

14. The non-transitory computer readable medium of claim 11 wherein the flow rule attribute is a flow scale or performance requirement.

* * * * *